US008054652B2

(12) United States Patent
Miftakhutdinov et al.

(10) Patent No.: US 8,054,652 B2
(45) Date of Patent: Nov. 8, 2011

(54) SYSTEMS AND METHODS FOR OFF-TIME CONTROL IN A VOLTAGE CONVERTER

(75) Inventors: Rais K. Miftakhutdinov, Cary, NC (US); Lin Sheng, Raleigh, NC (US); John R. Wiggenhorn, Cary, NC (US); Jin Liang, Apex, NC (US); Steven Tumasz, Chichester, NH (US); Hong Huang, Andover, MA (US)

(73) Assignee: Texas Instruments Incorporated, Dallas, TX (US)

( * ) Notice: Subject to any disclaimer, the term of this patent is extended or adjusted under 35 U.S.C. 154(b) by 574 days.

(21) Appl. No.: 12/022,965

(22) Filed: Jan. 30, 2008

(65) Prior Publication Data

US 2009/0021962 A1 Jan. 22, 2009

Related U.S. Application Data

(60) Provisional application No. 60/949,985, filed on Jul. 16, 2007.

(51) Int. Cl.
*H02M 3/335* (2006.01)
*H02M 3/24* (2006.01)

(52) U.S. Cl. ...................................... 363/21.01; 363/98

(58) Field of Classification Search .................... 363/16, 363/17, 20, 21.01, 97, 98, 131, 132; 323/268, 323/271

See application file for complete search history.

(56) References Cited

U.S. PATENT DOCUMENTS 6,292,376 B1 * 9/2001 Kato .......................... 363/21.09
6,314,010 B1 * 11/2001 Markow et al. ................ 363/97
7,072,190 B2 7/2006 Schlecht
7,116,014 B1 10/2006 Herbert
7,269,034 B2 9/2007 Schlecht
7,272,021 B2 9/2007 Schlecht et al.
7,295,449 B2 * 11/2007 Berghegger .................... 363/19
7,450,402 B2 * 11/2008 Jitaru ............................. 363/20
7,518,888 B2 * 4/2009 Chu et al. .................. 363/21.12
2005/0094330 A1 5/2005 Guenther et al.
2007/0076450 A1 4/2007 Kumar et al.

OTHER PUBLICATIONS

U.S. Appl. No. 12/022,378, filed Jan. 30, 2008, Miftakhutdinov et al.

Miftakhutdinov et al., "New Generation Intermediate Bus Converter", Oct. 30, 2007, Presentation Handouts from Conference, pp. 1-13, Dallas, TX.

Miftakhutdinov et al., "New Generation Intermediate Bus Converter", Oct. 30, 2007, Paper Presented at Conference, pp. 1-8, Dallas, TX.

Barry, "Design Issues in Regulated and Unregulated Intermediate Bus Converters", 2004, APEC 2004 Conference Proceedings, pp. 1389-1394. Mills, "An Alternative Power Architecture for Next Generation Systems", 2004, IPEMC 2004 Conference Proceedings, pp. 67-725.

White, "Emerging On-Board Power Architectures", 2003, APEC 2003 Conference Proceedings, pp. 799-804.

No Author, "Selection of Architecture for Systems using Bus Converters and POL Converters", May 2005 Design Note 023, Ericsson Inc., pp. 1-.

* cited by examiner

*Primary Examiner* — Matthew Nguyen
(74) *Attorney, Agent, or Firm* — William B. Kempler; Wade J. Brady, III; Frederick J. Telecky

(57) ABSTRACT

Various embodiments of the present invention provide voltage converters and methods for using such. As one example, a voltage converter is disclosed that includes a transformer with a first winding and a second winding. A voltage is applied to the first winding for a period that is followed by an OFF time. The voltage converter further includes an OFF time controller that is operable to adjust the OFF time based at least in part on a load current traversing the second winding.

19 Claims, 8 Drawing Sheets

SYSTEMS AND METHODS FOR OFF-TIME CONTROL IN A VOLTAGE CONVERTER

CROSS REFERENCE TO RELATED APPLICATION

The present application claims priority to (i.e., is a non-provisional of) U.S. Pat. App. No. 60/949,985 entitled "Off Time Control for Unregulated Intermediate Bus Voltage and Method Thereof", and filed Jul. 16, 2007 by Miftakhutdinov et al. The entirety of the aforementioned application is incorporated herein by reference for all purposes.

BACKGROUND OF THE INVENTION

The present invention is related to power supplies, and in particular to voltage converters.

Electrical power requirements are typically satisfied by deploying one or more power supplies in relation to a particular system. For example, telecommunication and data communication systems often employ power supplies deployed in relation to an Intermediate Bus Architecture (IBA). In some such cases, the IBA based system includes a front end AC-DC power supply that generates a DC voltage. This DC voltage is supplied to the input of an Intermediate Bus Converter (IBC) that provides isolation and converts the input voltage to a lower level DC voltage supplying numerous so called point-of-load regulators (POLs). The non-isolated POLs provide required supply voltages to specific digital or analog electronic functional blocks. The POLs are generally located close to the related electronic blocks to provide highest quality supply voltages.

The aforementioned IBC may be implemented using one of the topologies depicted in FIGS. 1*a*-1*c*. In particular, FIG. 1*a* shows a forward type full-bridge voltage converter topology 110, FIG. 1*b* shows a half-bridge voltage converter topology 120, and FIG. 1*c* depicts a push-pull voltage converter topology 130. Depending on input voltage range and output voltage tolerances, the IBC can be regulated with feedback loop taken from its output voltage, semi-regulated by input voltage feed-forward, or simply unregulated. Unregulated IBC implementations are often more cost effective, and generally operate at a maximum duty cycle for highest efficiency and power density.

Existing unregulated voltage converters exhibit various performance limits. For example, before a primary side transistor is turned on, one or more transistors used for rectification in the secondary side must be turned off. Where the transistors on the secondary side remain on while the primary side transistors are turning on, a current overshoot occurs on the primary and secondary sides limited only by the leakage inductance of the transformer and transformer winding resistances. To avoid this problem, existing unregulated voltage converters enforce a predetermined OFF time between the switching of transistors on the primary side and those of the secondary side that is fixed over the load range of the voltage converter. This predetermined limit is selected to allow avoidance of overshoot during both high load current operation and low load current operations. Such an approach offers protection from the overshoot condition, but results in an increased OFF time during nominal loading. This results in increased conduction of the body diode of the transistors on the secondary side and a corresponding increase in conduction losses. Further, such an increased OFF time causes a decrease in effective duty cycle and a corresponding decrease in an output voltage of and unregulated voltage converter. In some cases, an additional snubber circuit protection is used and/or higher voltage rated transistors to reduce the impact of any overshoot. Such an approach, however, is costly in terms of both components and size.

Thus, for at least the aforementioned reasons, there exists a need in the art for advanced approaches to voltage conversion.

BRIEF SUMMARY OF THE INVENTION

The present invention is related to power supplies, and in particular to voltage converters.

Various embodiments of the present invention provide voltage converters and methods for using such. As one example, a voltage converter is disclosed that includes a transformer with a first winding and a second winding. A voltage is applied to the first winding for a period that is followed by an OFF time. The voltage converter further includes an OFF time controller that is operable to adjust the OFF time based at least in part on a load current traversing the second winding. In some instances of the aforementioned embodiments, the OFF time controller defines the OFF time during a steady state operation, and a startup circuit defines the OFF time during a startup condition.

In various instances of the aforementioned embodiments, the OFF time controller is operable to gradually adjust the OFF time between a maximum value associated with a light loading condition and a minimum value associated with a heavy loading condition. In such instances, the OFF time controller may include an amplifier circuit that compares a voltage corresponding to a current in the first winding to a threshold voltage, and provides a gradually varying output reflecting a result of the comparison. The gradually varying output may be provided to a monostable multivibrator that adjusts an assertion time of a nominal OFF time pulse based on the gradually varying output.

In other instances of the aforementioned embodiments, the OFF time controller is operable to step the OFF time between a maximum value associated with a light loading condition and a minimum value associated with a heavy loading condition. In such instances, the OFF time controller may include a comparator with hysteresis that compares a voltage corresponding to a current in the first winding to a threshold voltage, and provides a step output reflecting a result of the comparison. The step output may be provided to a monostable multivibrator that adjusts an assertion time of a nominal OFF time pulse based on the step output.

In some instances of the aforementioned embodiments, the voltage is applied to the first winding through control of four transistors. In such instances, a first leg of a first transistor and a first leg of a second transistor are electrically coupled to a first pole of the voltage, a first leg of a third transistor and a first leg of a fourth transistor are electrically coupled to a second pole of the voltage, a second leg of the first transistor and a second leg of the third transistor are electrically coupled to a first end of the first winding, and a second leg of the second transistor and a second leg of the fourth transistor are electrically coupled to a second end of the first winding. A gate of the first transistor is electrically coupled to a first duty cycle controlled clock, a gate of the second transistor is electrically coupled to a second duty cycle controlled clock, a gate of the third transistor is electrically coupled to a third duty cycle controlled clock, and a gate of the fourth transistor is electrically coupled to a fourth duty cycle controlled clock. A first delay period is implemented by the OFF time controller to assure that there is no overlap between assertion of the first duty cycle controlled clock and the third duty cycle controlled clock, and a second delay period is implemented by the OFF time controller to assure that there is no overlap between assertion of the second duty cycle controlled clock and the fourth duty cycle controlled clock. In some such instances, the first delay period and the second delay period are the same. In other cases, the first delay period and the second delay period are independent. In various instances, some combination of the first delay period, the second delay period and the OFF time assure that there is an overlap between assertion of the third duty cycle controlled clock and the fourth duty cycle controlled clock.

Other embodiments of the present invention provide methods for voltage conversion. Such methods include providing a voltage converter having a transformer with a first winding and a second winding, periodically applying a voltage to the first winding such that the voltage is applied for a period that is followed by an OFF time, and adjusting the OFF time based at least in part on a load current traversing the second winding. In some instances of the aforementioned embodiments, the OFF time is gradually adjusted between a maximum value associated with a light loading condition and a minimum value associated with a heavy loading condition. In other instances of the aforementioned embodiments, the OFF time is stepped between a maximum value associated with a light loading condition and a minimum value associated with a heavy loading condition.

In particular instances of the aforementioned embodiments, the voltage is applied to the first winding through control of four transistors. In such instances, a first leg of a first transistor and a first leg of a second transistor are electrically coupled to a first pole of the voltage, a first leg of a third transistor and a first leg of a fourth transistor are electrically coupled to a second pole of the voltage, a second leg of the first transistor and a second leg of the third transistor are electrically coupled to a first end of the first winding, and a second leg of the second transistor and a second leg of the fourth transistor are electrically coupled to a second end of the first winding. A gate of the first transistor is electrically coupled to a first duty cycle controlled clock, a gate of the second transistor is electrically coupled to a second duty cycle controlled clock, a gate of the third transistor is electrically coupled to a third duty cycle controlled clock, and a gate of the fourth transistor is electrically coupled to a fourth duty cycle controlled clock. In such instances, the methods may further include setting a delay period such that there is no overlap between assertion of the first duty cycle controlled clock and the third duty cycle controlled clock, and there is no overlap between assertion of the second duty cycle controlled clock and the fourth duty cycle controlled clock. The methods may further include maintaining a combination of the delay period and the OFF time such that there is an overlap between assertion of the third duty cycle controlled clock and the fourth duty cycle controlled clock.

Yet other embodiments of the present invention provide voltage converters that have a transformer with a first winding and a second winding. A voltage is periodically applied to the first winding through control of four transistors. A first of the four transistors has a first leg electrically coupled to a first pole of the voltage, a second leg electrically coupled to a first end of the first winding, and a gate electrically coupled to a first duty cycle controlled clock. A second of the four transistors has a first leg electrically coupled to a first pole of the voltage, a second leg electrically coupled to a second end of the first winding, and a gate electrically coupled to a second duty cycle controlled clock. A third of the four transistors has a first leg electrically coupled to a second pole of the voltage, a second leg electrically coupled to the first end of the first winding, and a gate electrically coupled to a third duty cycle controlled clock. A fourth of the four transistors has a first leg electrically coupled to a second pole of the voltage, a second leg electrically coupled to the second end of the first winding, and a gate electrically coupled to a fourth duty cycle controlled clock. The voltage converters further include a clock generator that is operable to assure that there is no overlap between assertion of the first duty cycle controlled clock and the third duty cycle controlled clock, no overlap between assertion of the second duty cycle controlled clock and the fourth duty cycle controlled clock, and overlap between the third duty cycle controlled clock and the fourth duty cycle controlled clock.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
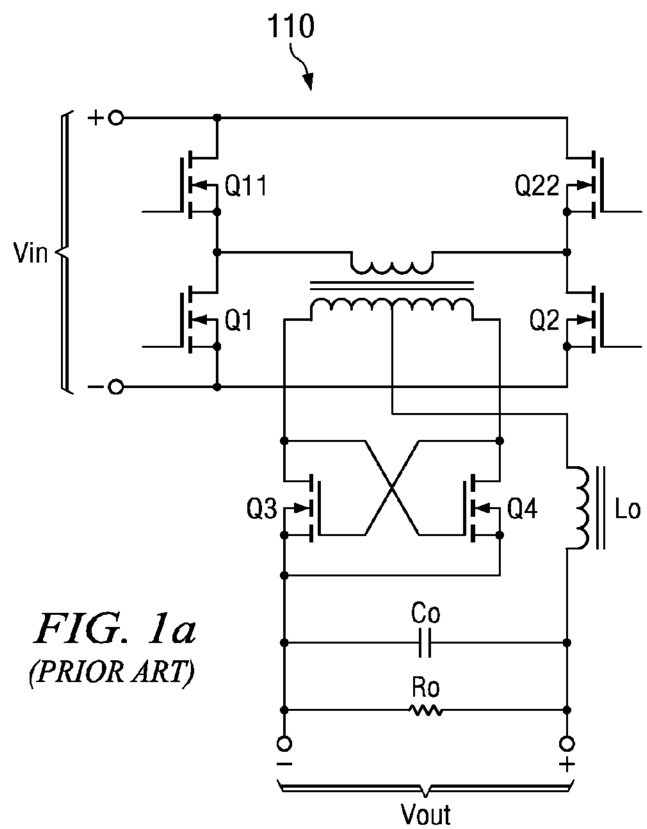
FIGS. 1*a-c* depict various prior art voltage converter topologies.

The present invention is related to power supplies, and in particular to voltage converters.

Various embodiments of the present invention provide voltage converters and methods for using such. As one example, a voltage converter is disclosed that includes a transformer with a first winding and a second winding. A voltage is applied to the first winding for a period that is followed by an OFF time. The voltage converter further includes an OFF time controller that is operable to adjust the OFF time based at least in part on a load current traversing the second winding.

In some instances of the aforementioned embodiments, the voltage is applied to the first winding through control of four transistors. In such instances, a first leg of a first transistor and a first leg of a second transistor are electrically coupled to a first pole of the voltage, a first leg of a third transistor and a first leg of a fourth transistor are electrically coupled to a second pole of the voltage, a second leg of the first transistor and a second leg of the third transistor are electrically coupled to a first end of the first winding, and a second leg of the second transistor and a second leg of the fourth transistor are electrically coupled to a second end of the first winding. A gate of the first transistor is electrically coupled to a first duty cycle controlled clock, a gate of the second transistor is electrically coupled to a second duty cycle controlled clock, a gate of the third transistor is electrically coupled to a third duty cycle controlled clock, and a gate of the fourth transistor is electrically coupled to a fourth duty cycle controlled clock. A first delay period is implemented by the OFF time controller to assure that there is no overlap between assertion of the first duty cycle controlled clock and the third duty cycle controlled clock, and a second delay period is implemented by the OFF time controller to assure that there is no overlap between assertion of the second duty cycle controlled clock and the fourth duty cycle controlled clock. In some such instances, the first delay period and the second delay period are the same. In other cases, the first delay period and the second delay period are independent. In various instances, some combination of the first delay period, the second delay period and the OFF time assure that there is an overlap between assertion of the third duty cycle controlled clock and the fourth duty cycle controlled clock.

As used herein, the phrase "electrically coupled" is used in its broadest sense to mean a coupling whereby an electrical signal can pass from one node to another. Thus, two nodes may be electrically coupled directly via, for example, a wire, a resistor, or the like, or indirectly via, for example, an intervening electrical device such as a transistor, an opto-isolator, or a capacitor. In such an indirect coupling, a derivative of the electrical signal may be passed, such as in the case of a transistor, where an electrical signal is connected to the gate of the transistor causing a derivative of the electrical signal to be provided from the source of the transistor. In any event, such an indirect coupling from gate to source would be considered an electrical coupling for purposes of this document. Also, as used herein, the term "leg" is used in its broadest sense to mean a transistor input. Thus, in the case of a FET, a leg may be, but is not limited to, a source or a drain node of the transistor. Also, where the term "gate" is used, it is used in its broadest sense to mean a transistor input that is capable of controlling activity at another leg. Based on the disclosure provided herein, one of ordinary skill in the art will recognize a variety of "legs" and "gates" depending upon the particular type of transistor used.

One or more advantages may be achieved through use of the different embodiments of the present invention including, but not limited to, increasing the efficiency and reliability of secondary side rectifier by setting OFF time operation over optimized for output over an extended current range, and preventing self-oscillation and allowing faster switching of secondary side rectifier transistors by shorting the primary winding in full-bridge configuration of unregulated converter during OFF time. Based on the disclosure provided herein, one of ordinary skill in the art will appreciate other advantages that may be achieved through implementation of embodiments of the present invention.

Figure 2A:
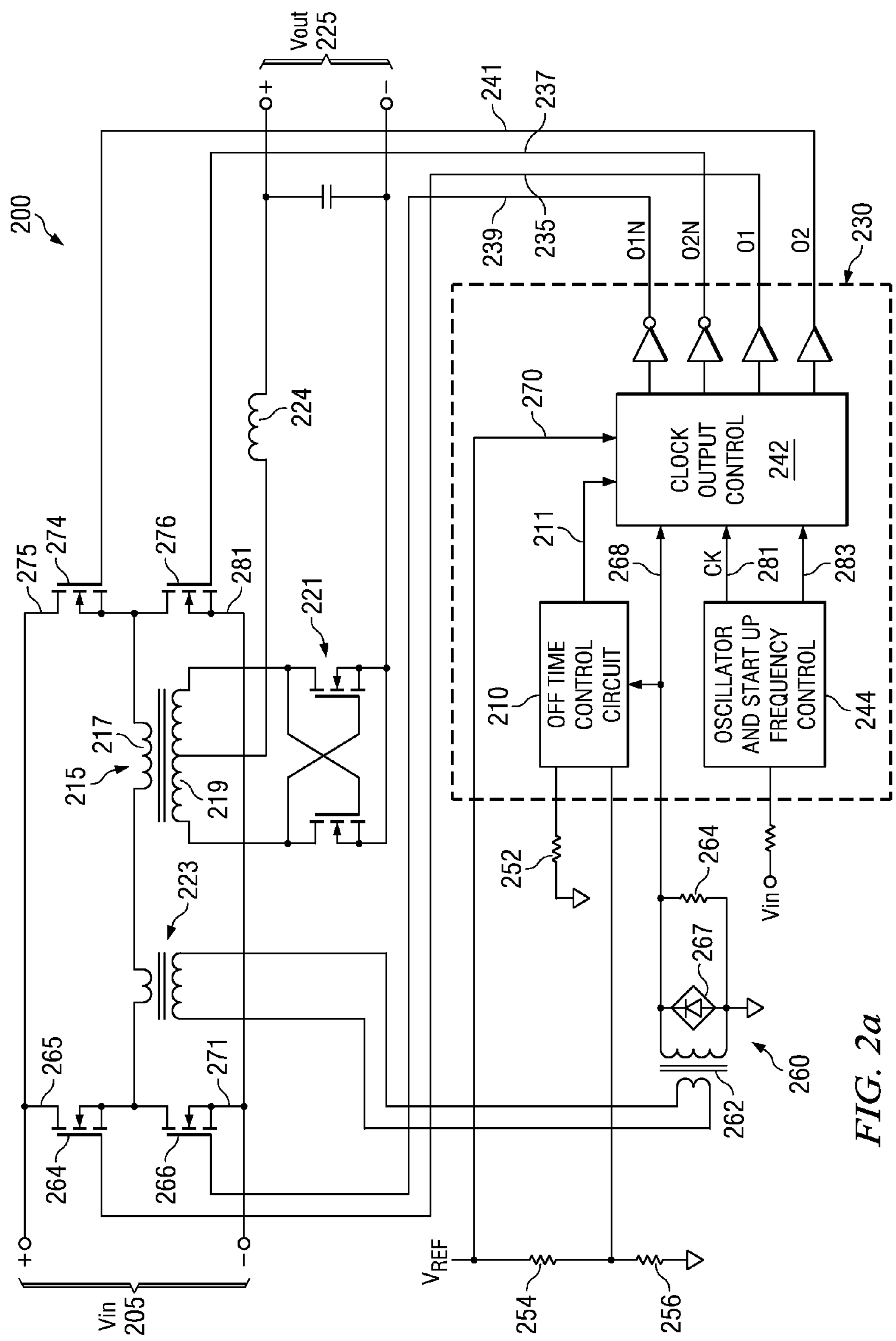
FIG. 2*a* shows a voltage converter including adjustable OFF time control in accordance with various embodiments of the present invention.

Turning to FIG. 2*a*, a voltage converter 200 including an adjusting OFF time control circuit 210 in accordance with various embodiments of the present invention is depicted. OFF time control circuit 210 allows a user to define a threshold below which OFF time is increased from a minimal value to maximum value, and allows a user to define on-delay and off-delay times. At light load, embodiments of the present invention assure that the OFF time is longer than at full load. This condition assures that a previously conducting rectifier transistor will be completely turned off before the next switching half-cycle. Controlling the amount of OFF time ensures that rectifier transistors have enough time to turn off before the primary side transistors force a turn-off condition. Where OFF time is not controlled, it can result in turning off the rectifier transistor while it is still conducting, which results in the current surge followed by the significant voltage spike thus lowering the efficiency and reliability.

Figure 1B:
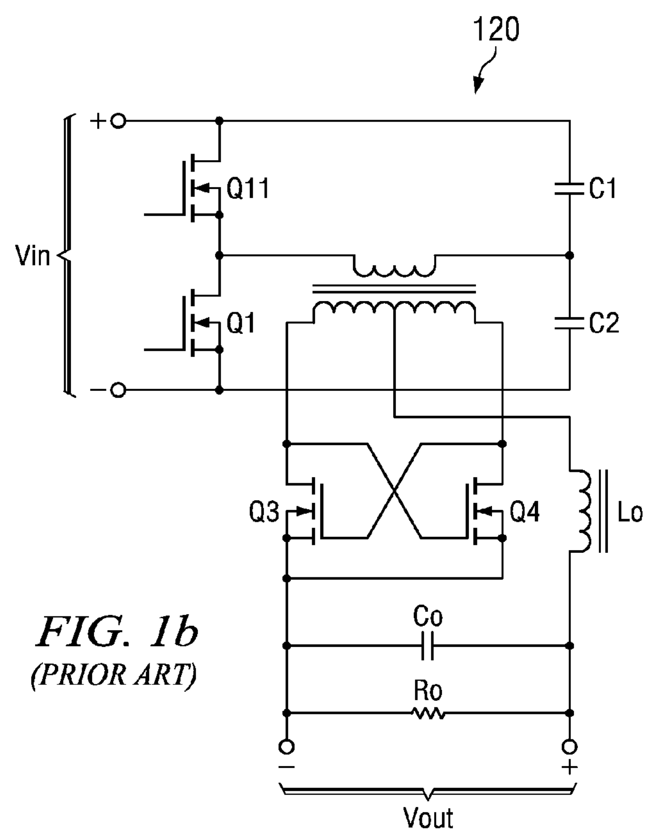
Figure 1C:
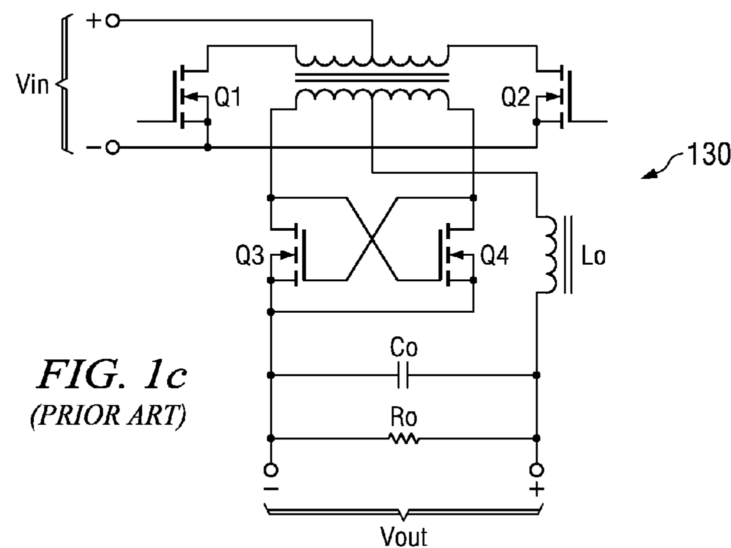

Voltage converter 200 includes a transformer 215 with a primary side winding 217 and a secondary side winding 219; a voltage output 225 that is electrically coupled to secondary side winding 219 via an inductor 219 and a rectifier 221. A voltage input 205 is selectably applied across primary winding 217 by a set of transistors 264, 266, 274, 276. In particular, a leg 265 of transistor 264 and a leg 275 of transistor 274 are electrically coupled to one pole of voltage input 205, and a leg 271 of transistor 266 and a leg 281 of transistor 276 are electrically coupled to the other pole of voltage input 205. The gate of transistor 264 is electrically coupled to a first duty cycle controlled clock signal 235 provided by clock generator 230, the gate of transistor 276 is electrically coupled to a second duty cycle controlled clock signal 237 provided by clock generator 230, the gate of transistor 266 is electrically coupled to a third duty cycle controlled clock signal 239 provided by clock generator 230, and the gate of transistor 274 is electrically coupled to a fourth duty cycle controlled clock signal 241 provided by clock generator 230. In some embodiments of the present invention, duty cycle controlled clock 239 is an inverted version of duty cycle controller clock 235, and duty cycle controlled clock 237 is an inverted version of duty cycle controlled clock 241. It should be noted that clock generator 230 is applied to a converter that is similar to that of FIG. 1*a*. Further, it should be noted that with some modification, clock converter 230 may be applied to converters with a topology similar to that in either FIG. 1*b* or FIG. 1*c*. Alternatively, clock generator 230 may be applied to other types of converter topologies known in the art.

Clock generator 230 is responsible for controlling the OFF time and the duty cycle of duty cycle controlled clocks 235, 237, 239, 241. Clock generator 230 includes a clock output control circuit 242, an oscillator and start-up frequency control circuit 244, and OFF time control circuit 210. Clock output control circuit 242 receives an OFF time control signal 211 from OFF time control circuit 210. This is an analog signal that is used to indicate an increase or decrease in OFF time. Further, clock output control circuit 242 receives a voltage reference signal 270. The voltage reference signal is used as an enable to preclude circuit operation when the voltage reference or some other signal is out of specification. Yet further, clock output control circuit 242 receives a sense current 268 that corresponds to the current traversing primary winding 217. In an unregulated voltage converter, there is typically no direct access to the load current. Thus, sense current 268 is derived from primary winding 217 using a current transformer 223. The output of current transformer

223 is provided to a current sense circuit 260 that includes an isolation element 262, a rectifier 267 and a resistor 264.

In addition, clock output control circuit 242 receives a clock signal 281 from oscillator and start-up frequency control circuit 244, and a duty cycle controlled clock 283 that is generated based on clock signal 281. Oscillator and start-up frequency control circuit 244 is responsible for adjusting the frequency of oscillation during start-up until a desired steady state operation can be achieved. In particular, oscillator and start-up frequency control circuit 244 operates to control the ripple current exhibited across inductor 224. This offers an improved start-up characteristic where a large capacitive load exists by reducing the peak to average ratio of output inductor current. Various implementations of oscillator and start-up frequency control circuit 244 are disclosed in U.S. patent application Ser. No. 12/022,378 entitled "Systems and Methods for Frequency Control of a Voltage Converter" and filed by Miftakhutdinov et al. on Jan. 30, 2008. The entirety of the aforementioned patent application is incorporated herein by reference for all purposes. In some embodiments of the present invention, clock generator 230 is integrated into a semiconductor controller integrated circuit that is easily added to a particular current converter topology. It should be noted that in some embodiments of the present invention clock generator 230 may be augmented to include one or more additional functions that are known in the art for implementing circuit protection and the like.

Figure 2B:
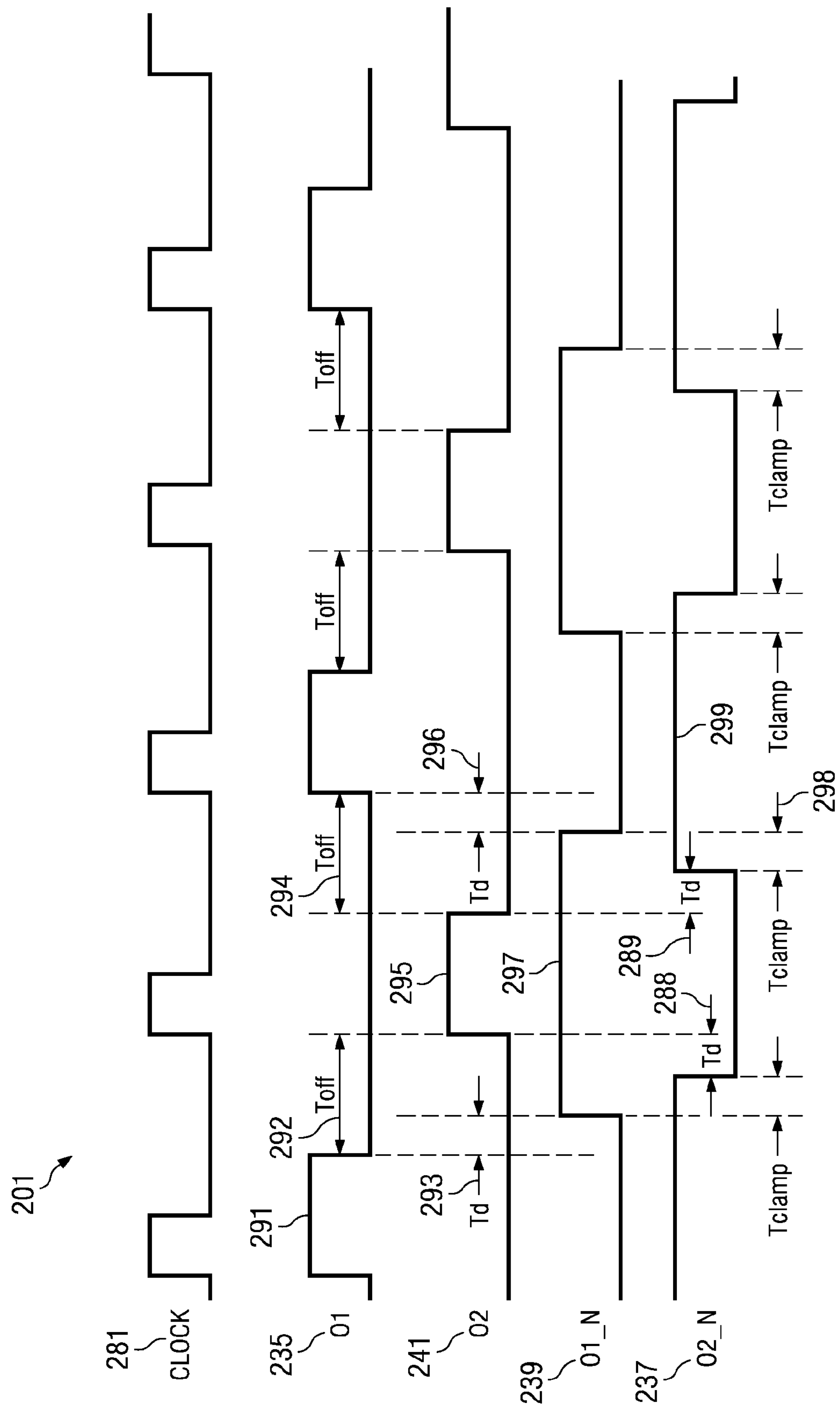
FIG. 2*b* is a timing diagram depicting an exemplary operation of the voltage converter of FIG. 2*a;*

In operation, clock output control circuit 242 provides duty cycle controlled clock signals 235, 237, 239, 241 that are used to drive the gates of transistors 264, 266, 274, 276. Turning to FIG. 2*b*, a timing diagram 201 depicts an exemplary sequence of duty cycle controlled clock signals 235, 237, 239, 241 provided from clock output control circuit 242. Clock 281 is received, and based thereon, duty cycle controlled clock 235 and duty cycle controlled clock 241 are generated. Duty cycle controlled clock 235 is synchronized to clock 281 but is asserted high for a period 291 that is greater than that of the corresponding assertion of clock 281. Period 291 is adjustable based on OFF time control signal 211 from OFF time control circuit 210, and the adjustment results in control of an OFF time period 292. Similarly, on a subsequent assertion of clock 281, duty cycle controlled clock 241 is asserted high for a period 295 that is greater than that of the corresponding assertion of clock 281. Period 295 is adjustable based on OFF time control signal 211 from OFF time control circuit 210, and the adjustment results in control of an OFF time period 294. In general, duty cycle controlled clock 283 from oscillator and start-up frequency control circuit 244 controls the outputs of clock output control 242 during start-up, and OFF time control signal 211 from OFF time control circuit 210 controls the outputs of clock output control 242 during established operation. Circuits demonstrating this control are discussed below in relation to FIGS. 4*a*-4*b*.

Duty cycle controlled clock 239 is substantially an inverted version of duty cycle controlled clock 235 except that an on-delay period 293 and an off-delay period 296 are introduced to avoid any overlap of the two signals. Similarly, duty cycle controlled clock 237 is substantially an inverted version of duty cycle controlled clock 241 except that an on-delay period 288 and an off-delay period 289 are introduced to avoid any overlap in the two signals. On-delay periods 288, 293 and off-delay periods 289, 296 are selected to assure that there is an overlap between high assertions of duty cycle controlled clock 239 and duty cycle controlled clock 237. The overlap periods are identified as clamp periods 298 on timing diagram 201. This clamp period operates to short primary winding 217 of transformer 215 to prevent self-oscillation and avoid reverse energy flow from a load capacitor electrically coupled to secondary winding 219 during OFF time periods 292, 294. On-delay period 293 and off-delay period 296 are designed to assure that transistor 264 and transistor 266 do not turn on at the same time resulting in a short; and on-delay period 288 and off-delay period 289 are designed to assure that transistor 274 and transistor 276 do not turn on at the same time resulting in a short. In some embodiments of the present invention, on-delay periods 289, 293 and off-delay periods 289, 296 are selected to be as short as possible while at the same time assuring that the aforementioned short conditions do not occur. In some embodiments of the present invention, on-delay times and off-delay times may be adjustable by modifying the value of resistor 252 depicted in FIG. 2*a*.

As previously discussed, OFF time periods 292, 294 are adjustable to match varying load current conditions. In particular, one or more embodiments of the present invention provide for a user selectable OFF time which is fixed to some nominal value above a programmable load current threshold and is decreased when a load current below the defined threshold is detected. This self adjusting OFF time can be implemented either as a gradual change as shown in FIG. 3*a*, or as a stepped changed with some hysteresis as shown in FIG. 3*b*.

Figure 3A:
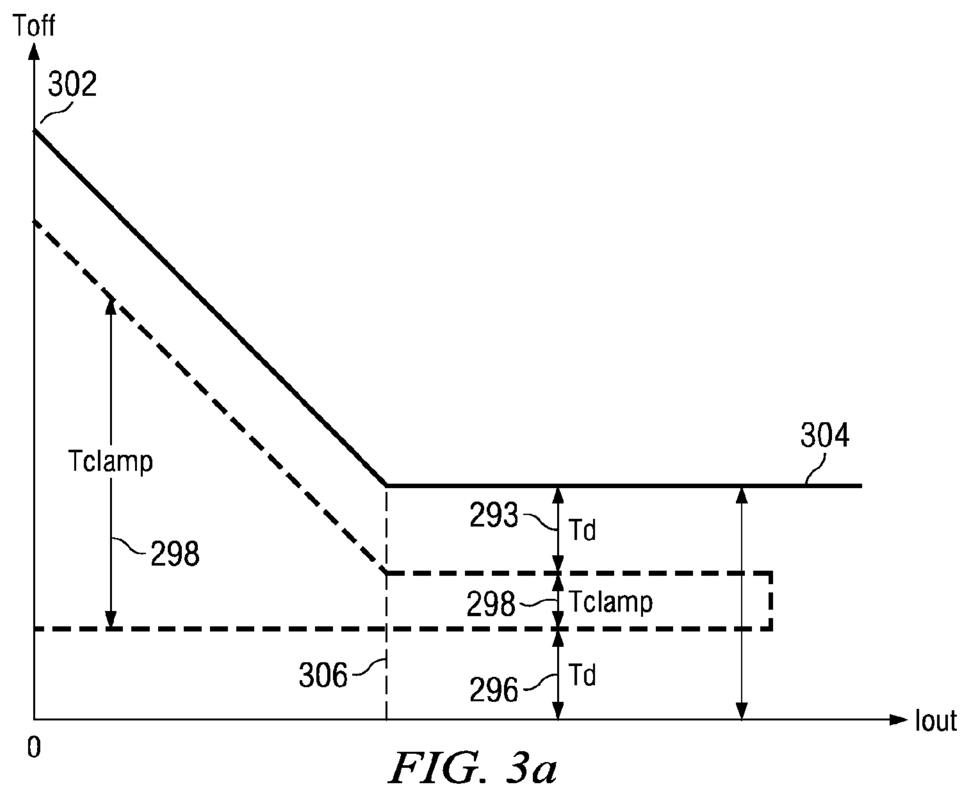
FIG. 3*a* depicts a ramped modification of OFF time implemented by a voltage converter in accordance with some embodiments of the present invention.

Turning to FIG. 3*a*, a maximum OFF time period 302 occurs where the load current for a load electrically coupled to secondary winding 219 is zero, and a minimum OFF time period 304 occurs once the load current exceeds a threshold 306. The OFF time period gradually decreases from maximum 302 to minimum 304 as the load current increases from zero to threshold 306. As shown, delay periods 293, 296 remain constant over the period of operation, but clamp period 298 adjusts as a function of OFF time. Operating with a variable OFF time period between the zero load current point and threshold 306 limits the possibility of cross conduction at light loading. Operating with minimum OFF time period 304 after threshold 306 is exceeded results in minimal diode conduction over a wide range of loading conditions. In some embodiments of the present invention, threshold 306 is set by adjusting resistor divider including resistor 254 and resistor 256 of FIG. 2*a*. At heavy loading, OFF time is controlled by resistor 252. In some instances, OFF time at no load (i.e., maximum OFF time period 302) is set to be five times that occurring when the load current is twenty percent of that exhibited at threshold 306.

Figure 3B:
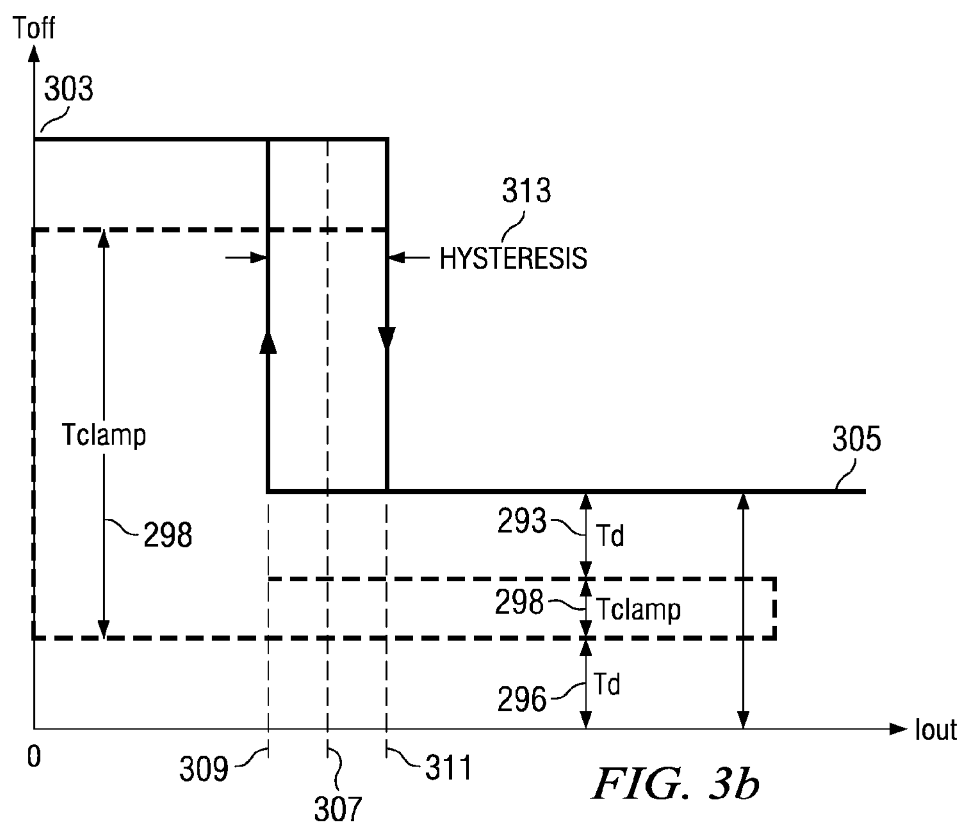
FIG. 3*b* depicts a stepped modification of OFF time implemented by a voltage converter in accordance with other embodiments of the present invention.

Turning to FIG. 3*b*, a maximum OFF time period 303 occurs where the load current for a load electrically coupled to secondary winding 219 is zero, and a minimum OFF time period 305 occurs once the load current exceeds a center threshold 307 by a given amount. In particular, the OFF time period remains at maximum 303 until the load current increases beyond a threshold 311 at which time it transitions to minimum 305. The OFF time period remains at minimum 305 until the load current decreases beyond a threshold 309 at which time it transitions to maximum 303. Operating with maximum OFF time period 303 between the zero load current point and threshold 307 limits the possibility of cross conduction at light loading. Operating with minimum OFF time period 305 after threshold 307 is exceeded results in minimal diode conduction over a wide range of loading conditions. In some embodiments of the present invention, threshold 307 is set by adjusting resistor divider including resistor 254 and resistor 256 of FIG. 2*a*. At heavy loading, OFF time is controlled by resistor 252. In some instances, OFF time at no load (i.e., maximum OFF time period 303) is set to be five times that occurring when the load current is twenty percent of that exhibited at threshold 307. An amount of hysteresis 313 is controlled by the difference between threshold 309 and threshold 311 around center threshold 307. Inclusion of the hysteresis avoids oscillation where the comparator is tripped back and forth as the load current transitions through the center threshold 307. As shown, delay periods 293, 296 remain constant over the period of operation, but clamp period 298 adjusts as a function of OFF time.

Figure 4:
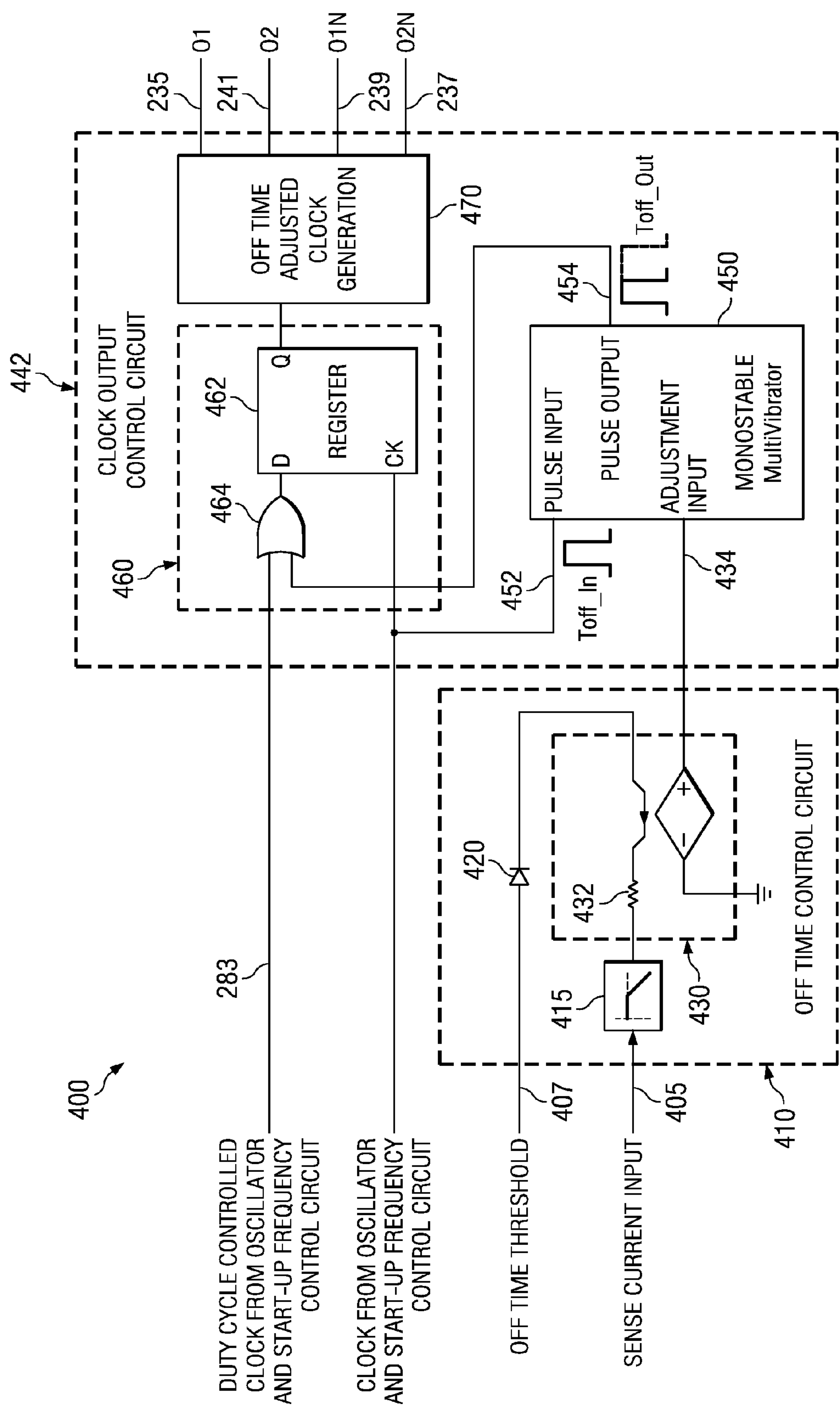
FIG. 4 depicts a circuit for implementing an adjusting OFF time and clock generation circuit in accordance with various embodiments of the present invention.

Turning to FIG. 4, a circuit 400 for implementing OFF time control circuit 210 and clock output control circuit 242 is depicted in accordance with various embodiments of the present invention. In particular, circuit 400 is designed to implement a gradually change in OFF time such as that depicted above in FIG. 3*a*. Circuit 400 includes an OFF time control circuit 410 that may be used in place of OFF time control circuit 210, and a clock output control circuit 442 that may be used in place of clock output control circuit 242. OFF time control circuit 410 receives a sense current input 405 (a voltage corresponding to sense current 268 of FIG. 2*a*) via a filter 415, and an OFF time threshold 407 (corresponding to the voltage at the node between resistor 254 and resistor 256 of FIG. 2*a*) via a diode 420. Off time control circuit 410 includes an amplifier 430 with a gain control resistor 432. Amplifier 430 provides an analog output 434. Where sense current input 405 is greater than or equal to OFF time threshold 407, the there is no current flow in the branch because of diode 420 blocking the current. Alternatively, where sense current input 405 is less than OFF time threshold 407, there current flow that reaches its maximum when sense current input 405 equals zero. Based on the disclosure provided herein, one of ordinary skill in the art will recognize a variety of amplifiers that may be used to implement amplifier 430 in accordance with different embodiments of the present invention.

Clock output control circuit 442 includes a monostable multivibrator 450, a longest OFF time selector circuit 460, and an OFF time adjusted clock generation circuit 470. Monostable multivibrator 450 may be any circuit known in the art that is capable of extending the assertion time of a signal based upon a variable input. Monostable multivibrator 450 receives a periodic pulse input 452 that may be, for example, a clock output from oscillator & start-up frequency control circuit 244. Monostable multivibrator 450 provides a time adjusted pulse output 454 that is periodic pulse input 452 asserted for an extended period, with the extended period corresponding to analog output 434. Thus, the period that time adjusted pulse output 454 is asserted time begins substantially coincident with the rising edge of periodic pulse input 452 and extends for an amount of time corresponding to analog output 434.

Time adjusted pulse output 454 is compared with duty cycle controlled clock 283 from oscillator & start-up frequency control circuit 244 by OFF time selector circuit 460 to determine which of the two signals provides the longest OFF time. The signal with the longest off time is selected as this will allow duty cycle controlled clock 283 to control during the start-up phase of the circuit, and for time adjusted pulse output 454 to control during the steady stat circuit operation. It should be noted that where oscillator & start-up frequency control circuit 244 is not included, that OFF time selector circuit 460 would not be used as time adjusted pulse output 454 would control at all times. The signal with the longest OFF time is provided to OFF time adjusted clock generation circuit 470 where it is used to generate duty cycle controlled clocks 235, 237, 239, 241 including on-delay, off-delay and clamping periods as discussed above in relation to FIG. 2*b*. Based on the disclosure provided herein, one of ordinary skill in the art will appreciate a variety of circuits that may be used to implement OFF time adjusted clock generation circuit 470 in accordance with different embodiments of the present invention. OFF time selector circuit 460 may be any number of circuits that is capable of identifying one of the two signals as having the longest OFF time, and passing the identified signal on to OFF time adjusted clock generation circuit 470. In one particular embodiment of the present invention, OFF time selector circuit 460 includes an OR gate 464 that logically ORs time adjusted pulse output 454 and duty cycle controlled clock 283, and latches the output of OR gate 464 using a flip-flop 462. The output of flip-flop 462 corresponds to the signal with the longest OFF time and is provided to OFF time adjusted clock generation circuit 470.

Figure 5:
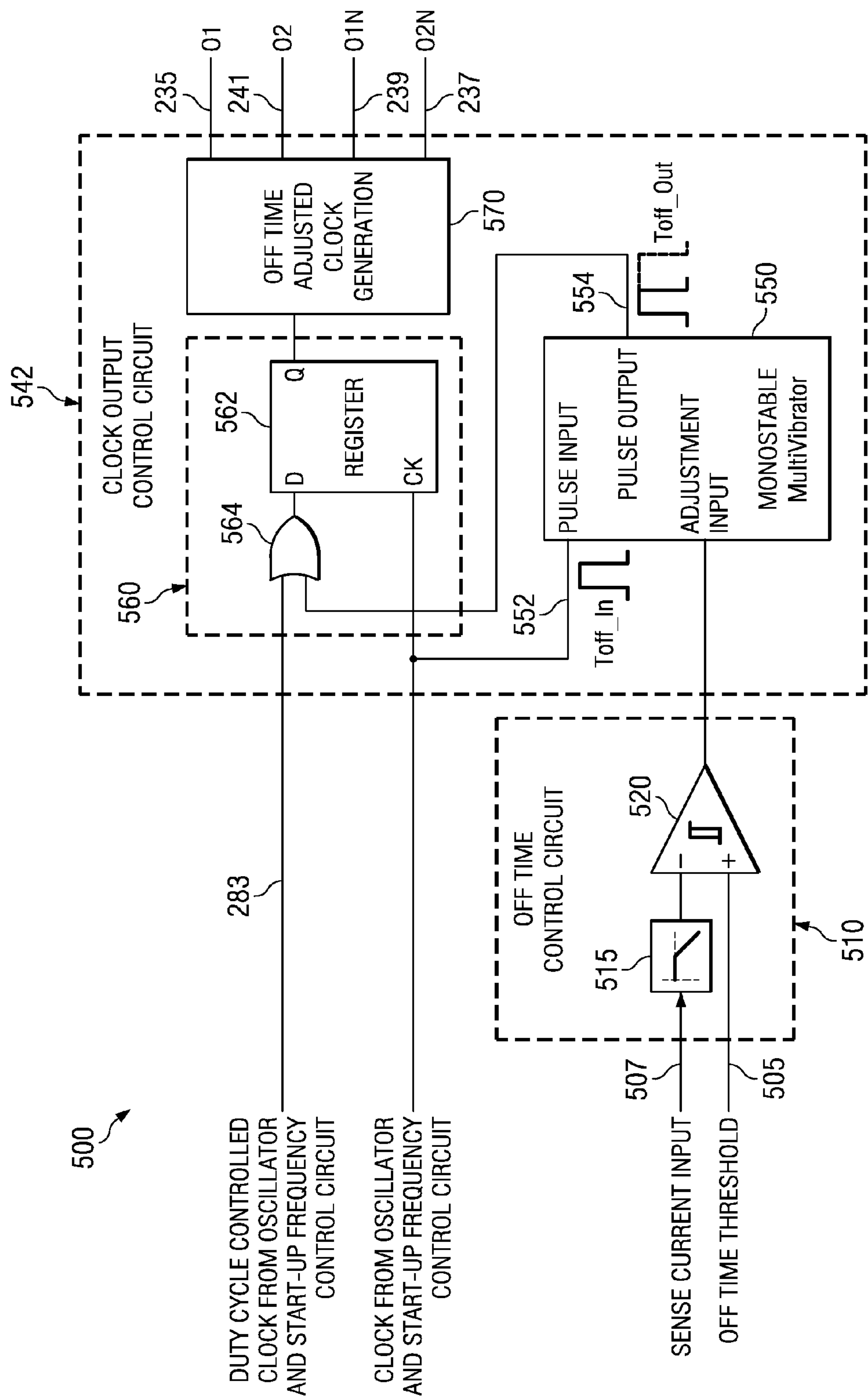
FIG. 5 depicts another circuit for implementing an adjusting OFF time and clock generation circuit in accordance with other embodiments of the present invention.

Turning to FIG. 5, a circuit 500 for implementing OFF time control circuit 210 and clock output control circuit 242 is depicted in accordance with various embodiments of the present invention. In particular, circuit 500 is designed to implement a stepped change in OFF time such as that depicted above in FIG. 3*b*. Circuit 500 includes an OFF time control circuit 510 that may be used in place of OFF time control circuit 210, and a clock output control circuit 542 that may be used in place of clock output control circuit 242. OFF time control circuit 510 receives a sense current input 507 (a voltage corresponding to sense current 268 of FIG. 2*a*) via a filter 515, and an OFF time threshold 505 (corresponding to the voltage at the node between resistor 254 and resistor 256 of FIG. 2*a*). Off time control circuit 510 includes a comparator with hysteresis corresponding to the hysteresis of FIG. 3*b*. Based on the disclosure provided herein, one of ordinary skill in the art will recognize a variety of comparators and hysteresis settings that may be used in accordance with different embodiments of the present invention.

Clock output control circuit 542 includes a monostable multivibrator 550, a longest OFF time selector circuit 560, and an OFF time adjusted clock generation circuit 570. Monostable multivibrator 550 may be any circuit known in the art that is capable of extending the assertion time of a signal based upon a variable input. Monostable multivibrator 550 receives a periodic pulse input 552 that may be, for example, a clock output from oscillator & start-up frequency control circuit 544. Monostable multivibrator 550 provides a time adjusted pulse output 554 that is periodic pulse input 552 asserted for an extended period, with the extended period corresponding to analog output 534. Thus, the period that time adjusted pulse output 554 is asserted time begins substantially coincident with the rising edge of periodic pulse input 552 and extends for an amount of time corresponding to analog output 534.

Time adjusted pulse output 554 is compared with duty cycle controlled clock 283 from oscillator and start-up frequency control circuit 244 by OFF time selector circuit 560 to determine which of the two signals provides the longest OFF time. The signal with the longest off time is selected as this will allow duty cycle controlled clock 283 to control during the start-up phase of the circuit, and for time adjusted pulse output 554 to control during the steady stat circuit operation. It should be noted that where oscillator and start-up frequency control circuit 244 is not included, that OFF time selector circuit 560 would not be used as time adjusted pulse output 554 would control at all times. The signal with the longest OFF time is provided to OFF time adjusted clock generation circuit 570 where it is used to generate duty cycle controlled clocks 235, 237, 239, 241 including on-delay, off-delay and clamping periods as discussed above in relation to FIG. 2*b*. Based on the disclosure provided herein, one of ordinary skill in the art will appreciate a variety of circuits that may be used to implement OFF time adjusted clock generation circuit 570 in accordance with different embodiments of the present invention. OFF time selector circuit 560 may be any number of circuits that is capable of identifying one of the two signals as having the longest OFF time, and passing the identified signal on to OFF time adjusted clock generation circuit 570. In one particular embodiment of the present invention, OFF time selector circuit 560 includes an OR gate 564 that logically ORs time adjusted pulse output 554 and duty cycle controlled clock 283, and latches the output of OR gate 564 using a flip-flop 562. The output of flip-flop 562 corresponds to the signal with the longest OFF time and is provided to OFF time adjusted clock generation circuit 570.

Figure 6:
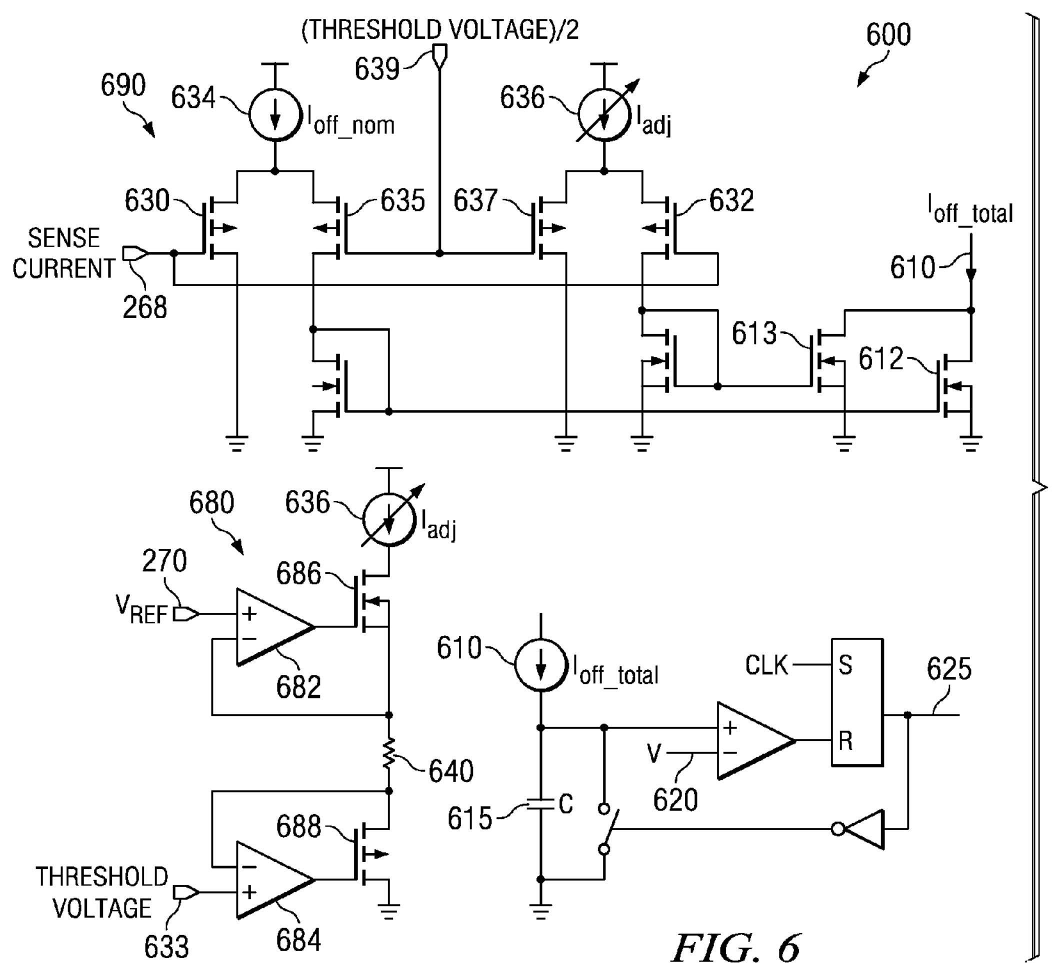
FIG. 6 shows an exemplary circuit capable of adjusting OFF time in accordance with different embodiments of the present invention.

FIG. 6 shows an exemplary circuit 600 capable of adjusting OFF time in accordance with different embodiments of the present invention. In circuit 600, OFF time is effectively controlled by a current 610 traversing a transistor 612 and a transistor 613, an internal capacitor 615, and a fixed voltage 620. In particular, circuit 600 produces an OFF time output 625 defined by the following equation:

$$\text{OFF time output}=C*V/I_{Off\_Total}.$$

It should be noted that current 610 may be generated in a number of ways. In the depicted example, a current steering circuit 690 provides one way to generate current 610. In particular, a voltage corresponding to sense current 268 is applied to the gate of a transistor 630 that passes a portion of a nominal current 634, and to the gate of a transistor 632 that passes a portion of an adjustable current 636. Adjustable current 636 is generated by a circuit 680 that includes two operational amplifiers 682, 684 whose outputs drive the gates of respective transistors 686, 688. The positive input of operational amplifier 682 is driven by voltage reference signal 270, and the positive input of operational amplifier 684 is driven by a threshold voltage 633 taken from the node between resistor 254 and resistor 256 of FIG. 2*a*. The negative input of operational amplifier 682 is taken from one node of a resistor 640, and the negative input of operational amplifier 684 is taken from the other node of resistor 640. Thus, adjustable current 636 is defined by the following equation:

$$I\text{adj}=(V_{REF}-V_{THRESHOLD})/\text{Resistor 640}.$$

A transistor 635 carries another portion of nominal current 634, and a transistor 637 carries another portion of adjustable current 636. The gates of transistors 635, 637 are each electrically coupled to threshold voltage 633 divided by two (a voltage 639). It should be noted that sense current input 268 and voltage 639 can use an analog level-shifter or multiplier to increase input range or accuracy. Adjustable current 636 determines the off-time at no-load condition, which can be adjusted by choosing reference voltage signal 270 and/or resistor 640 for a given design requirement.

Figure 7:
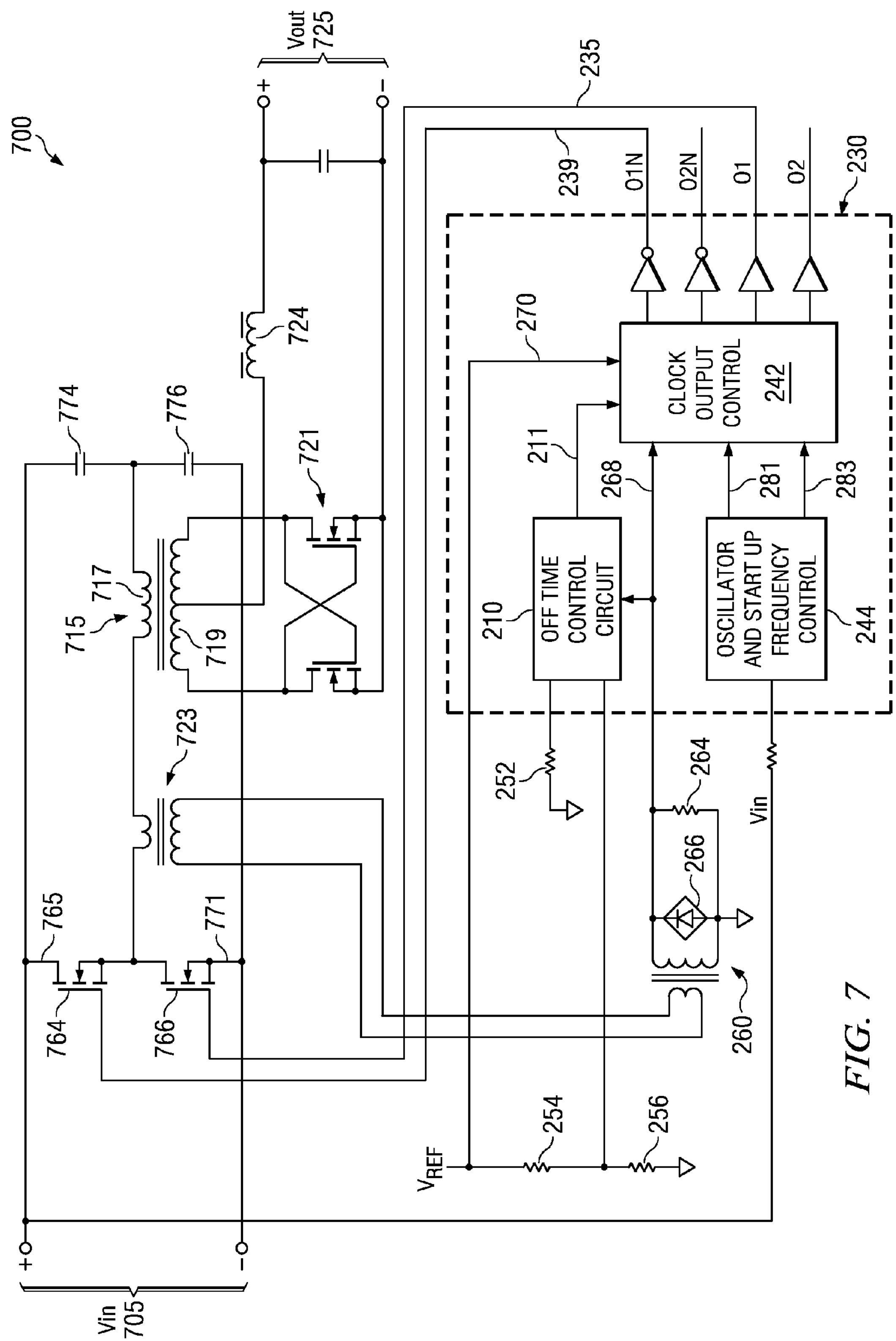
FIG. 7 depicts another voltage converter including adjustable OFF time control in accordance with different embodiments of the present invention.

Turning to FIG. 7, another voltage converter 700 including adjusting OFF time control is depicted in accordance with different embodiments of the present invention. In particular, voltage converter 700 is similar to voltage 200 except that the full bridge converter is replaced with a half-bridge topology (i.e., that of FIG. 1*b*) with corresponding changes to the clocking. Voltage converter 700 includes a transformer 715 with a primary side winding 717 and a secondary side winding 719; and a voltage output 725 that is electrically coupled to secondary side winding 719 via an inductor 724 and a rectifier 724. A voltage input 705 is selectably applied across primary winding 717 by a set of transistors 764, 766. In particular, a leg 765 of transistor 764 if electrically coupled to one pole of voltage input 705, and a leg 771 of transistor 766 is electrically coupled to the other pole of voltage input 705. A capacitor 774 is electrically coupled between one pole of voltage input 705 and primary winding 717, and another capacitor 776 is electrically coupled between the other pole of voltage input 705 and primary winding 717. The gate of transistor 764 is electrically coupled to a first duty cycle controlled clock signal 235 provided by clock generator 230, and the gate of transistor 266 is electrically coupled to duty cycle controlled clock signal 239. In some embodiments of the present invention, duty cycle controlled clock 239 is an inverted version of duty cycle controller clock 235. Of note, clamping is not possible in this configuration as there are only two controlling clock signals (i.e., O1 and O1N). Hence, while operation of clock generator 230 is similar to that described in relation to FIG. 2*a* and FIGS. 3*a*-3*b*, on-delay periods, off-delay periods, and clamping periods are not necessary and the circuitry of, for example, OFF time adjusted clock generation circuit 470 and OFF time adjusted clock generation circuit 570 used to generate the aforementioned periods may be eliminated.

In conclusion, the present invention provides novel systems, devices, methods for voltage conversion and operation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A voltage converter having an unregulated output and only primary side control, the voltage converter comprising:

a transformer, wherein the transformer includes a primary winding and a secondary winding, and wherein a voltage is applied to the primary winding for a period that is followed by an OFF time; and an OFF time controller providing only primary side control, wherein the OFF time controller is operable to adjust the OFF time based at least in part on a load current of the converter as determined from the primary winding and wherein the voltage regulator provides an unregulated output.

2. The voltage converter of claim 1, wherein the OFF time controller is operable to gradually adjust the OFF time between a maximum value associated with a light loading condition and a minimum value associated with a heavy loading condition.

3. The voltage converter of claim 2, wherein the OFF time controller includes an amplifier circuit that compares a voltage corresponding to a current in the primary winding to a threshold voltage and provides a gradually varying output reflecting a result of the comparison.

4. The voltage converter of claim 3, wherein the OFF time controller further includes a monostable multivibrator, wherein the monostable multivibrator receives a pulse input corresponding to a given OFF time, and wherein the monostable multivibrator provides a pulse output based on the gradually varying output and the pulse input and corresponding to an extended OFF time.

5. The voltage converter of claim 1, wherein the OFF time controller defines the OFF time during a steady state operation, and wherein the voltage converter further comprises:

a startup circuit, wherein the startup circuit is operable to define the OFF time during a startup condition.

6. The voltage converter of claim 1, wherein the OFF time controller is operable to step the OFF time between a maximum value associated with a light loading condition and a minimum value associated with a heavy loading condition.

7. The voltage converter of claim 6, wherein the OFF time controller includes a comparator circuit that compares a voltage corresponding to a current in the first winding to a threshold voltage and provides a step output reflecting a result of the comparison.

8. The voltage converter of claim 7, wherein the comparator circuit includes hysteresis around the threshold voltage.

9. The voltage converter of claim 7, wherein the OFF time controller further includes a monostable multivibrator, wherein the monostable multivibrator receives a pulse input corresponding to a given OFF time, and wherein the monostable multivibrator provides a pulse output based on the step output and the pulse input and corresponding to an extended OFF time.

10. The voltage converter of claim 1, wherein the voltage is applied to the primary winding through control of four transistors, wherein a first leg of a first transistor and a first leg of a second transistor are electrically coupled to a first pole of the voltage, wherein a first leg of a third transistor and a first leg of a fourth transistor are electrically coupled to a second pole of the voltage, wherein a second leg of the first transistor and a second leg of the third transistor are electrically coupled to a first end of the primary winding, wherein a second leg of the second transistor and a second leg of the fourth transistor are electrically coupled to a second end of the primary winding, wherein a gate of the first transistor is electrically coupled to a first duty cycle controlled clock, wherein a gate of the second transistor is electrically coupled to a second duty cycle controlled clock, wherein a gate of the third transistor is electrically coupled to a third duty cycle controlled clock, wherein a gate of the fourth transistor is electrically coupled to a fourth duty cycle controlled clock, wherein a first delay period is implemented by the OFF time controller to assure that there is no overlap between assertion of the first duty cycle controlled clock and the third duty cycle controlled clock, and wherein a second delay period is implemented by the OFF time controller to assure that there is no overlap between assertion of the second duty cycle controlled clock and the fourth duty cycle controlled clock.

11. The voltage converter of claim 10, wherein the first delay period and the second delay period are the same delay period.

12. The voltage converter of claim 10, wherein some combination of the first delay period, the second delay period and the OFF time assure that there is an overlap between assertion of the third duty cycle controlled clock and the fourth duty cycle controlled clock.

13. A method for voltage conversion, the method comprising:

providing an unregulated voltage converter having only primary side control and a transformer with a first winding and a secondary winding;

periodically applying a voltage to the first winding, wherein the voltage is applied for a period that is followed by an OFF time; and adjusting the OFF time based at least in part on a load current traversing of the converter as determined from the primary winding.

14. A method of claim 13, wherein the OFF time is gradually adjusted between a maximum value associated with a light loading condition and a minimum value associated with a heavy loading condition.

15. The method of claim 14, wherein the method further comprises:

determining whether a threshold has been exceeded; and upon exceeding the threshold, setting the OFF time to the minimum value.

16. The method of claim 13, wherein the OFF time is stepped between a maximum value associated with a light loading condition and a minimum value associated with a heavy loading condition.

17. The method of claim 16, wherein the method further comprises:

determining whether a threshold has been exceeded; and upon exceeding the threshold, setting the OFF time to the minimum value.

18. The method of claim 13, wherein the voltage is applied to the primary winding through control of four transistors, wherein a first leg of a first transistor and a first leg of a second transistor are electrically coupled to a first pole of the voltage, wherein a first leg of a third transistor and a first leg of a fourth transistor are electrically coupled to a second pole of the voltage, wherein a second leg of the first transistor and a second leg of the third transistor are electrically coupled to a first end of the primary winding, wherein a second leg of the second transistor and a second leg of the fourth transistor are electrically coupled to a second end of the primary winding, wherein a gate of the first transistor is electrically coupled to a first duty cycle controlled clock, wherein a gate of the second transistor is electrically coupled to a second duty cycle controlled clock, wherein a gate of the third transistor is electrically coupled to a third duty cycle controlled clock, wherein a gate of the fourth transistor is electrically coupled to a fourth duty cycle controlled clock; and wherein the method further comprises:

setting a delay period such that there is no overlap between assertion of the first duty cycle controlled clock and the third duty cycle controlled clock, and there is no overlap between assertion of the second duty cycle controlled clock and the fourth duty cycle controlled clock.

19. The method of claim 18, wherein the method further comprises:

maintaining a combination of the delay period and the OFF time such that there is an overlap between assertion of the third duty cycle controlled clock and the fourth duty cycle controlled clock.

* * * * *